(12) United States Patent
Yagnik (10) Patent No.: US 8,572,087 B1
(45) Date of Patent: Oct. 29, 2013

(54) CONTENT IDENTIFICATION

(75) Inventor: Jay Yagnik, Mountain View, CA (US)

(73) Assignee: Google Inc., Mountain View, CA (US)

(*) Notice: Subject to any disclaimer, the term of this patent is extended or adjusted under 35 U.S.C. 154(b) by 771 days.

(21) Appl. No.: 11/873,790

(22) Filed: Oct. 17, 2007

(51) Int. Cl.
*G06F 17/30* (2006.01)
*G06F 7/00* (2006.01)

(52) U.S. Cl.
USPC ............................ 707/738; 382/203; 707/771

(58) Field of Classification Search
USPC ..................... 707/6, 737, 738, 771; 382/203
See application file for complete search history.

(56) References Cited

U.S. PATENT DOCUMENTS

| | | | | | |
|---|---|---|---|---|---|
| 5,819,258 | A | * | 10/1998 | Vaithyanathan et al. | 707/692 |
| 5,893,095 | A | * | 4/1999 | Jain et al. | 707/6 |
| 5,933,823 | A | * | 8/1999 | Cullen et al. | 707/6 |
| 5,945,982 | A | * | 8/1999 | Higashio et al. | 707/3 |
| 6,092,072 | A | * | 7/2000 | Guha et al. | 707/700 |
| 6,459,809 | B1 | * | 10/2002 | Jensen et al. | 382/203 |
| 6,460,035 | B1 | * | 10/2002 | Siegwart | 707/737 |
| 7,043,474 | B2 | * | 5/2006 | Mojsilovic et al. | 707/6 |
| 7,165,147 | B2 | * | 1/2007 | Ting et al. | 711/137 |
| 7,383,258 | B2 | * | 6/2008 | Harik et al. | 707/999.005 |
| 7,478,091 | B2 | * | 1/2009 | Mojsilovic et al. | 707/6 |
| 7,499,916 | B2 | * | 3/2009 | Liu et al. | 707/3 |
| 2004/0014944 | A1 | * | 1/2004 | Linial et al. | 530/350 |
| 2006/0143176 | A1 | * | 6/2006 | Mojsilovic et al. | 707/6 |
| 2008/0010335 | A1 | * | 1/2008 | Wyler | 709/201 |
| 2008/0114750 | A1 | * | 5/2008 | Saxena et al. | 707/5 |

OTHER PUBLICATIONS

Burdick, et al., MAFIA: A Maximal Frequent Itemset Algorithm for Transactional Databases. In *Proceedings of the 17th International Conference on Data Engineering*. IEEE Computer Society, 2001, Washington, DC, USA, 443-452.
Grahne, G., and Zhu, J., "Efficiently Using Prefix-trees in Mining Frequent Itemsets," In *Proceedings of the ICDM 2003 Workshop on Frequent Itemset Mining Implementations*, Nov. 19, 2003, Melbourne, Florida, USA, 10 pages.

* cited by examiner

*Primary Examiner* — Pavan Mamillapalli
(74) *Attorney, Agent, or Firm* — Turocy & Watson, LLP

(57) ABSTRACT

Systems, computer program products, and methods can identify a training set of content, and generate one or more clusters from the training set of content, where each of the one or more clusters represent similar features of the training set of content. The one or more clusters can be used to generate a classifier. New content is identified and the classifier is used to associate at least one label with the new content.

24 Claims, 6 Drawing Sheets

CONTENT IDENTIFICATION

FIELD

The following disclosure relates to content identification.

BACKGROUND

Content including images, text and video can be associated with descriptive text due to the presentment of the content and descriptive text in a common location, such as in a web page, document, or the like. This association can form the basis for conventional search systems to identify the content responsive to a search query that includes a term within the descriptive text. As an illustrative example, a search query for the image of a 'car' may return images existing on web pages having the text 'car'. However, because the content itself is not tagged with the descriptive text, the content is not identifiable when associated descriptive text is not present. Further, new content cannot be identified and/or classified automatically without the manual identification or entry of descriptive text by a user.

SUMMARY

According to an implementation, a conjunction, such as a high-order conjunction, is generated that takes into consideration an arbitrary mixture of portions within content, such as images, to predict labels associated with the content. Content can subsequently be automatically tagged with labels that are descriptive of the content. This can, for instance, facilitate searching for the content via one or more search queries that may be satisfied by the tagged labels.

According to an implementation, a method includes identifying training content, and generating one or more clusters from the training content, where each of the one or more clusters represents similar features of the training content. The method also includes using the one or more clusters to generate a classifier, identifying new content, and associating at least one label with the new content using, at least in part, the classifier.

One or more of the following features may also be included. The training content can include images, web pages, printed material, audio, video, and/or text. The training content can also include one or more labels. The method can also include associating each of the one or more clusters with the one or more labels. According to another feature, the training content can include a plurality of images, and generating one or more clusters from the training set can include examining one or more regions within each of the plurality of images, and generating the one or more clusters based at least in part on the one or more regions.

According to another feature, using the one or more clusters to generate a classifier can include using the one or more clusters to generate a high order conjunction. Additionally, using the one or more clusters to generate a high order conjunction can include generating a plurality of conjunctions from respective groups of clusters of the one or more clusters, and scoring each of the plurality of conjunctions, where the score for each conjunction is based on the strength of the correlation of that conjunction with at least one label. Using the one or more clusters to generate a high order conjunction can also include identifying a best conjunction from the plurality of conjunctions based at least in part on the respective scores of each of the plurality of conjunctions, where the best conjunction has the strongest correlation, of all the plurality of conjunctions, with the at least one label.

According to yet another feature, the method can include generating a distributed data set using the one or more clusters, where the distributed data set identifies estimated probabilities of observing at least some of the one or more clusters in a corpus of content. In still another feature, using the one or more clusters to generate a high order conjunction can include identifying a next best conjunction, from the plurality of conjunctions, where the next best conjunction represents a conjunction of a higher order than the best conjunction.

These general and specific aspects may be implemented using a system, a method, or a computer program, or any combination of systems, methods, and computer programs.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The following disclosure describes systems, methods, and computer program products that can predict how content, such as images, are mapped to labels, such as text words. According to an implementation, a high order conjunction is generated that takes into consideration an arbitrary mixture of portions within content to predict labels associated with an image. Content can subsequently be automatically tagged with labels that are descriptive of the content. This can facilitate searching for the content via one or more search queries that may be satisfied by the tagged labels. The generation of a high order conjunction for use in predicting labels is described herein with respect to images. However, this disclosure is equally applicable to predicting labels for other types of content, such as documents, video, audio, and the like.

Figure 1:
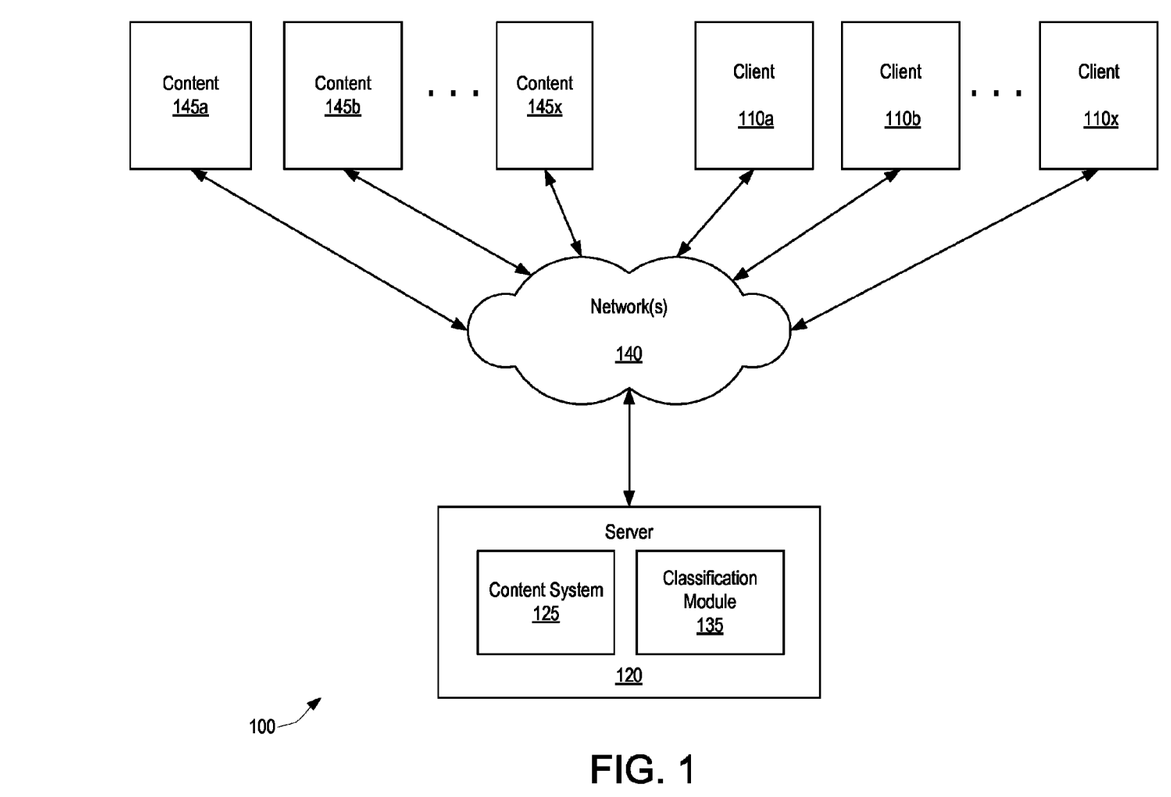
FIG. 1 shows an example classification system.

Referring to FIG. 1, an example classification system 100 is shown. The system 100 includes clients 110a, 110b, ... 110x in communication with a server 120 via one or more networks 140. The clients 110a, 110b, ... 110x can include a device, such as a personal computer, a wireless telephone, a personal digital assistant (PDA), a lap top computer, or another type of computation or communication device, a thread or process running on one of these devices, and/or an object executable by one of these devices. Although multiple clients 110a, 110b, . . . 110x and a single server 120 are illustrated in FIG. 1, there can be more servers and more or fewer clients. For instance, some of the functions performed by the server 120 can be performed by one or more other servers such that the server 120 can represent several devices, such as a network of computer processors and/or servers. Additionally, in some implementations a client can perform a function of the server 120 and the server 120 can perform a function of a client.

As shown in FIG. 1, the network(s) 140 can include one or more local area networks (LANs), wide area networks (WANs), telephone networks, such as the Public Switched Telephone Network (PSTN), intranets, the Internet, and/or or other type of network. The clients 110a, 110b, . . . 110x, server 120, and content 145a, 145b, . . . 145x can connect to the network(s) 140 via wired, wireless, or optical or other connections. In alternative implementations, one or more of the devices illustrated in FIG. 1 are directly connected to another one of the devices. For example, in one implementation, the content 145a, 145b, . . . 145x or one or more clients 110a, 110b, 110c, . . . 110x can be directly connected to the server 120.

The classification system 100 also includes content 145a, 145b, . . . 145x, which can be retrieved and/or transmitted to the server 120 via one or more networks 140. The content 145a, 145b, . . . 145x may reside on one or more servers or computers (not illustrated). According to an implementation, at least a portion of the content 145a, 145b, . . . 145x may reside on one or more of the clients 110a, 110b, . . . 110x. The content 145a, 145b, . . . 145x can include any content, including text, images, video, applications, documents, audio, and the like. The content 145a, 145b, . . . 145x can include a combination of elements, such as a web page including text, images, and video. The content may or may not include text, metadata, or other information (collectively, 'labels') identifying the content. As an illustrative example, content including an image of an automobile may be associated with the label "car" that identifies that the subject of the image is a car.

Referring again to FIG. 1, the server 120 can include one or more computers that gather, process, maintain, manage content and predict labels associated with content. In an implementation, the server 120 includes a content system 125 that retrieves and/or receives and stores the content 145a, 145b, . . . 145x. At least some of the content 145a, 145b, . . . 145x is used by the server 120 to generate a finite vocabulary, which the server 120 can use to predict labels for other content that is not associated with labels upon receipt by the content system 125, as described below. In particular, the server 120 can include a classification module 135 that is operable to run classification algorithms and perform processes to classify content, and which includes a predictive algorithm to associate labels with content. According to another implementation, server 120 can optionally include a query system (not illustrated) that receives a search query from a user, and provides search results to the user based on identification of labels associated with content.

Figure 2:
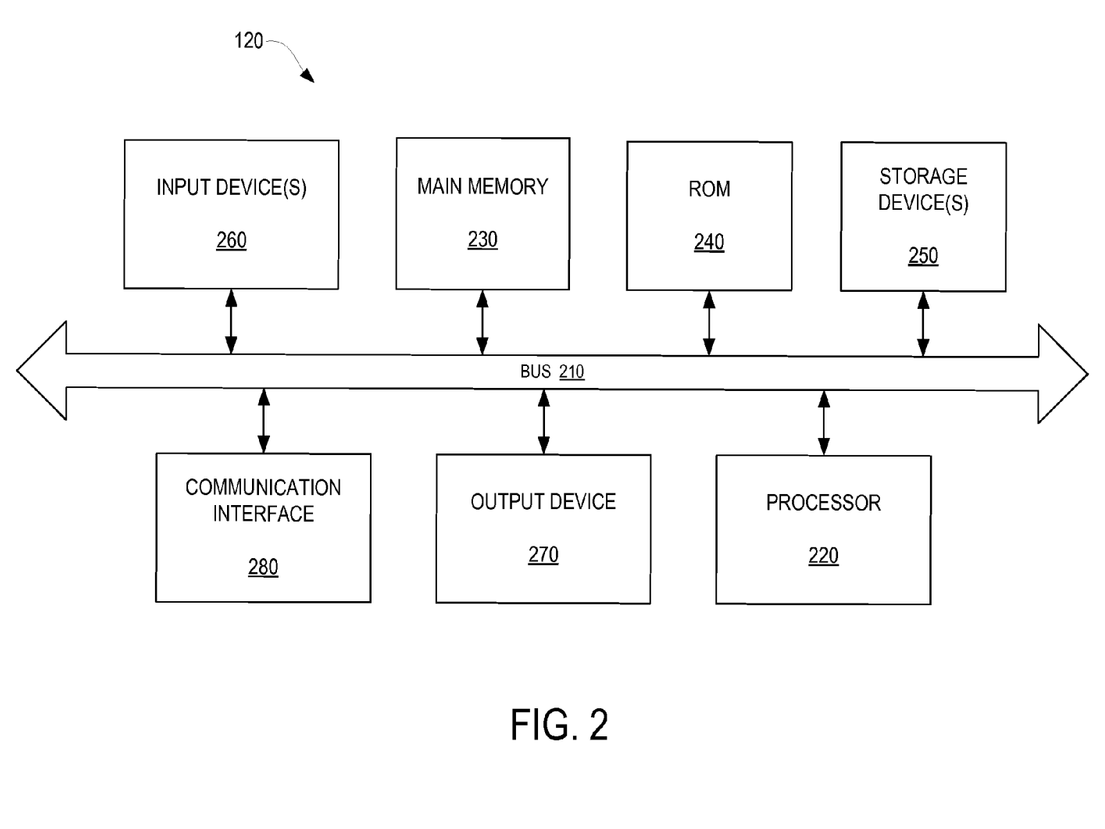
FIG. 2 shows an example server in the classification system of FIG. 1, according to an implementation.

FIG. 2 shows an example of server 120 of FIG. 1. The server 120 can include a bus 210, a processor 220, a main memory 230, a read only memory (ROM) 240, a storage device 250, one or more input devices 260, one or more output devices 270, and a communication interface 280. The server components may implement, in whole or part, the content system 125, classification module 135, and/or query system.

The bus 210 can include one or more paths that permit communication among the components of server 120. The processor 220 includes any type of conventional processor, microprocessor or processing logic that interprets and executes instructions. The main memory 230 can include a random access memory (RAM) or another type of dynamic storage device that stores information and instructions for execution by processor 220. The ROM 240 can include a conventional ROM device or another type of static storage device that stores static information and instructions for use by the processor 220, including, for instance, an operating system. Additionally, the storage device 250 can include a magnetic and/or optical recording medium and its corresponding drive.

The server 120 can also include an input device 260 having one or more conventional mechanisms that permit a user to input information to the server 120, such as a keyboard, a mouse, a pen, voice recognition and/or biometric mechanisms, or the like. The output device 270 includes one or more conventional mechanisms that output information to the user, such as a display, a printer, a speaker, or the like. The communication interface 280 can include any transceiver-like mechanism that enables the server 120 to communicate with other devices and/or systems. For example, the communication interface 280 can include mechanisms for communicating with another device or system via one or more networks, such as the network(s) 140.

In operation the server 120 can generate a high order conjunction to predict labels associated with content. Content can subsequently be automatically tagged with labels that are descriptive of the content. This can facilitate searching for the content via one or more search queries that may be satisfied by the tagged labels.

As an illustrative example, a large number of images having automobiles as their subject (as identified by existing labels associated with images) may be selected as a training group or set and examined at different scales and positions by an image processing algorithm. Like portions of the images are placed into groups, or clusters. Thereafter, a new image of a car that is not associated with a label is analyzed at the same scales and/or positions, and portions within the new image are added to similar clusters. The server can then utilize a high order conjunction to predict and associate one or more labels with the image of the car although the image was previously unassociated with a label.

In one implementation, the server 120 performs these operations in response to the processor 220 executing software instructions contained in a computer-readable medium, such as memory 230. The software instructions can be read into the memory 230 from another computer readable medium, such as a data storage device 250, or from another device via the communication interface 280. The software instructions contained in the memory 230 cause processor 220 to perform processes described in this disclosure. Alternatively, hardwired circuitry can be used in place of or in combination with software instructions to implement processes consistent with the disclosure. Thus, implementations are not limited to any specific combination of hardware circuitry and software.

Figure 3:
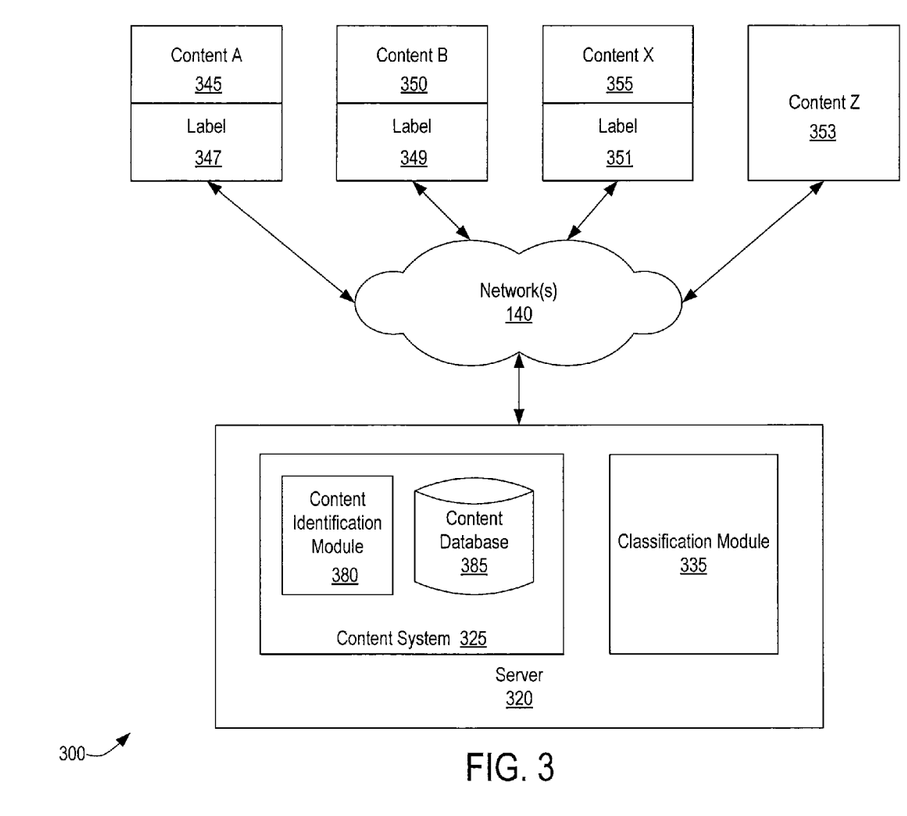
FIG. 3 is a functional block diagram illustrating elements of an example classification system.

FIG. 3 is block diagram of various elements of an example classification system 300. The server 320 includes a content system 325 and a classification module 335. The content system 325 includes a content identification module 380 that is operable to identify and/or receive content 345, 350, 355, 353 from one or more sources and to provide the content 345, 350, 355, 353 to a content database 385 for storage. As shown in FIG. 3, at least some of the content 345, 350, 355 may be associated with one or more labels 347, 349, 351, which can include one or more words, symbols, numbers and/or letters that can describe the content. For instance, the labels 347, 349, 351 can describe the type of file or format of the content 345, 350, 355, the subject matter of the content 345, 350, 355, properties of the content (e.g., date of creation) 345, 350, 355, and the like. The content identification module 380 is operable to collect the labels 347, 349, 351 associated with (or stored within) the content 345, 350, 355 and to store the labels in the content database 385. According to an implementation, content 345, 350, 355, 353 and their associated labels, if any, can be stored in one or more tables within the content database 385 such that content and labels can be quickly identified and retrieved by the server 320.

According to one aspect, at least a portion of content 345, 350, 355 associated with labels 347, 349, 351 can be used as a training set. The training set can be used to associate one or more labels stored within the content database 385 with one or more portions of content not previously associated with one or more labels upon receipt and/or identification of the content at the server 120, such as 'Content Z' 353 in FIG. 3. According to an implementation, the classification module 335 is operable to predict how the content 353 should be mapped to previously identified labels stored in the content database 385. The classification module 335 can automatically tag content with labels that are descriptive of the content. This can facilitate searching for the content via one or more search queries that may be satisfied by the tagged labels.

According to an implementation where content includes an image, to predict one or more labels associated with an image the classification module 335 can generate a conjunction, such as a high order conjunction, that takes into consideration an arbitrary mixture of regions within a training set of images to predict labels that should be associated with the image.

The system 300 components illustrated in FIG. 3 can be implemented in software, hardware, or a combination of hardware and software. In addition, each of the components can represent one or more computer processors, threads, and/or objects. It should also be understood that in alternative implementations, the functions performed by one of the components in FIG. 3 can be performed by another component. In yet other implementations, a single logical block/processing device can perform all of the functions of the content system 325 and/or classification module 335. For instance, the content identification module 380 and classification module 335 may be implemented via one or more computer programs. According to another illustrative example, the content database 385 may be located external to the content system 125 and/or server 120, and may be implemented by a series of databases, including those that are external to the content system 125 or server 120.

Figure 4:
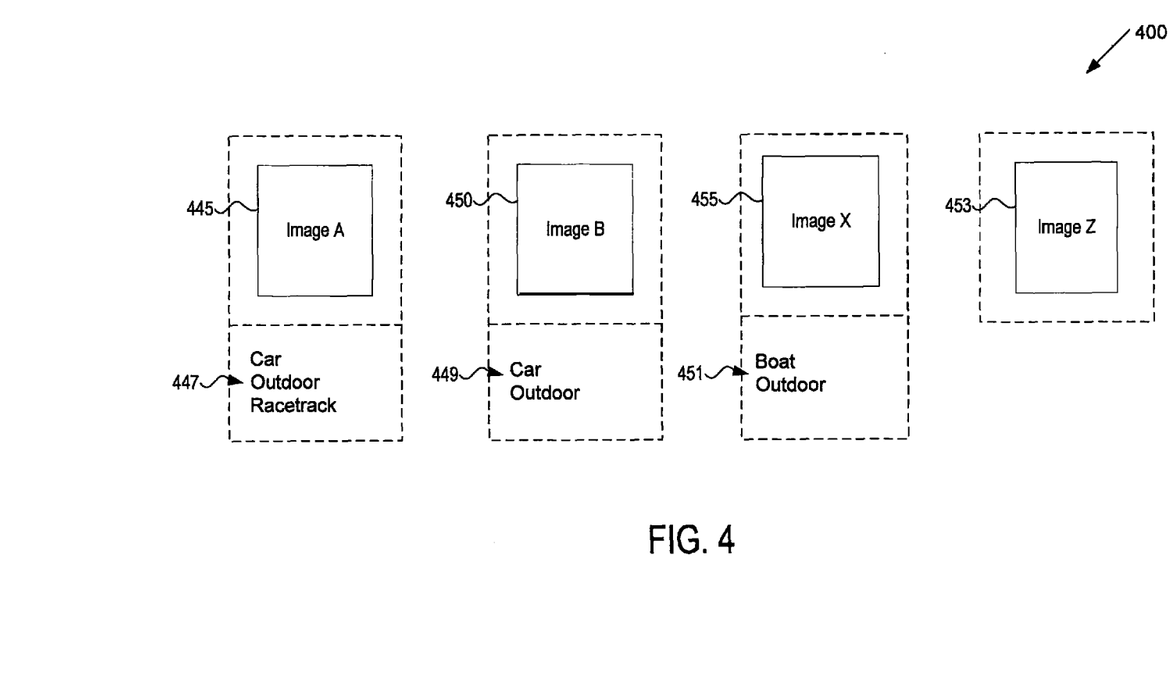
FIG. 4 shows example content used in a classification system.

FIG. 4 shows example content 400. The example content includes images 445, 450, 455, 453. At least some of the content is tagged with labels 447, 449, 451, such as text words. For instance, image A 445 is tagged with three text words, including 'car', 'outdoor', and 'racetrack'. According to an implementation, the text words are descriptive of an image with which they are tagged, or descriptive of the contents of an image with which they are tagged. For instance, the text words 'car', 'outdoor', and 'racetrack' can describe the subject of the image A 445, such as a car on an outdoor racetrack. According to another illustrative example, an image can be tagged with text words describing the person whom or device that created or captured the image, the date the image was created or modified, or other information that is descriptive of the content. According to an implementation, the content identification module 380 is operable to identify a large volume of content and any labels associated with the content.

The four example images 445, 450, 455, 453, and their associated labels 447, 449, 451 may be stored in the content database 385 for processing by the classification module 335. According to an illustrative example, the first three images 445, 450, 455 and their associated labels may comprise a training set of content that is used to associate the labels with features (or portions) of the first three images. Using the training set the classification system can predict and assign labels to the fourth image 453. In particular, the classification system can learn the features of the fourth image 453 and can automatically identify and tag the fourth image with one or more descriptive labels. For instance, the fourth image 453 may be tagged with the labels 'car' and 'boat' if the subject matter of the image 453 includes a car and a boat. The automatic identification and tagging of content with labels will next be described with respect to the block diagram flow charts of FIGS. 5-7.

Figure 5:
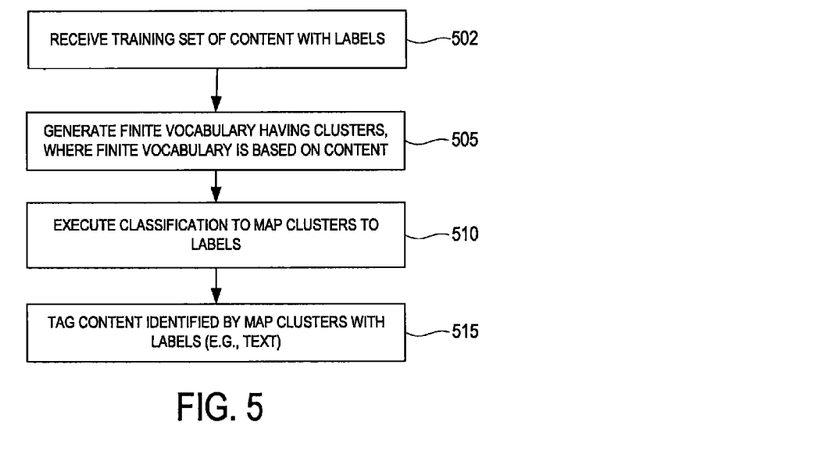
FIG. 5 is a block diagram flowchart showing an example method implemented by a classification system.

FIG. 5 is a block diagram flowchart showing a high level method implemented by an example classification system. As shown in FIG. 5, a training set of content associated with label(s) is received (502). According to an implementation, the content identification module 380 is operable to receive the training set of content and to store the content, including associated labels, in the content database 385.

According to an implementation, the content is parsed into one or more portions and placed in one or more clusters. In some implementations, the content is parsed into regions and those regions that have similar patterns are grouped into a cluster. Each cluster is associated with at least one label, where the finite number of associations between the clusters and labels is referred to as a finite vocabulary (505). According to an implementation, the finite vocabulary can include a table of clusters and their associated label(s). According to an implementation, each cluster is associated with a cluster number. For instance, a label that includes the word 'car' may be mapped to one or more cluster numbers. According to an implementation, the finite vocabulary includes a table that identifies by cluster numbers every cluster associated with each label identified within a training set of content.

Using the finite vocabulary, upon identifying new content, portions in the new content that are similar to the one or more clusters can be identified (e.g., by a classifier), and mapped to one or more labels (510). According to an implementation, the classification may be executed by the classification module 335. The new content may be tagged by labels associated with the clusters of the new piece of content (515).

Figure 6:
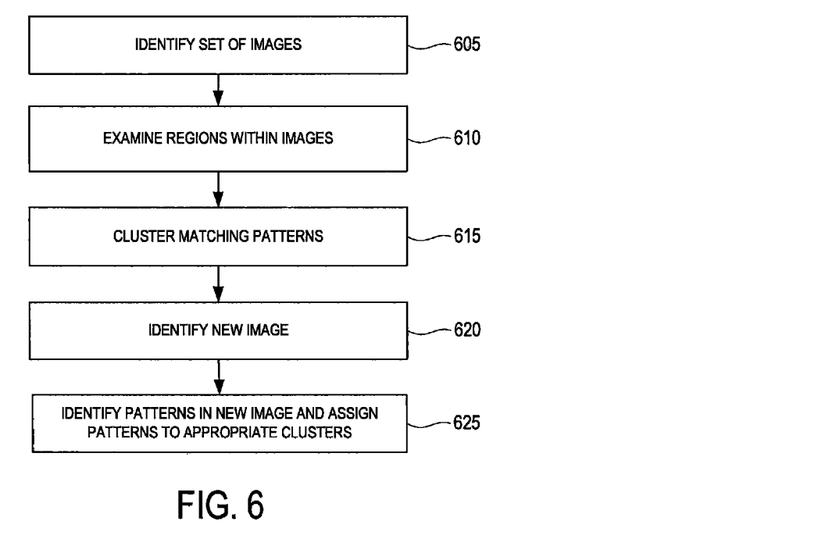
FIG. 6 is a block diagram flow chart showing an example method of generating a finite vocabulary.

FIG. 6 is a block diagram flow chart showing an example method of generating the finite vocabulary, according to an implementation. The block diagram flow chart of FIG. 6 is described with respect to content including images. However, it will be appreciated that the process of generating a finite vocabulary is applicable to any type of content, including documents, video, audio, and the like.

A set of training set of images is received and/or identified, where each of the images within the training set are associated with one or more label(s) (605). According to an implementation, the images may be collected by the content identification module 380 and/or retrieved from the content database 385. The images within the training set are parsed into multiple regions (610). In particular, the images may be examined by an image processing algorithm that examines the images at different scales and positions. According to an implementation, each image in the training set is subjected to the same image processing. For example, the classification module 335 may examine several thousand, or millions, or images within a training set of images at the same scales and positions to extract portions from the images. For instance, blocks of pixels within each image may be examined in 20 by 20 pixel regions, in 8 by 8 pixel regions, or the like, and/or at different positions within each image. According to an implementation, the image processing algorithm can be implemented by the classification module 335 of the server 120.

The extracted portions are compared to each other, and matching or similar patterns within the extracted portions are identified. The portions having matching or similar patters patterns are clustered (615). For instance, where an extracted portion includes a particular feature within an image, the extracted portion is clustered with other portions having a similar feature. As described above, each cluster may be associated with a particular cluster number.

According to an implementation, once a new image is identified (620), the image is subjected to the same image processing (625) used to parse the training set of images into multiple regions. Regions within the new image are then identified and assigned to appropriate clusters having similar features. For instance, regions within the new image are assigned cluster numbers matching the cluster numbers of similar regions identified by the training set. Because an image may be made up of many distinct features, regions within a new image may be assigned to a variety of clusters, each of which correspond to a particular feature within images. Thereafter labels can be associated with the images based on the assigned clusters.

Figure 7:
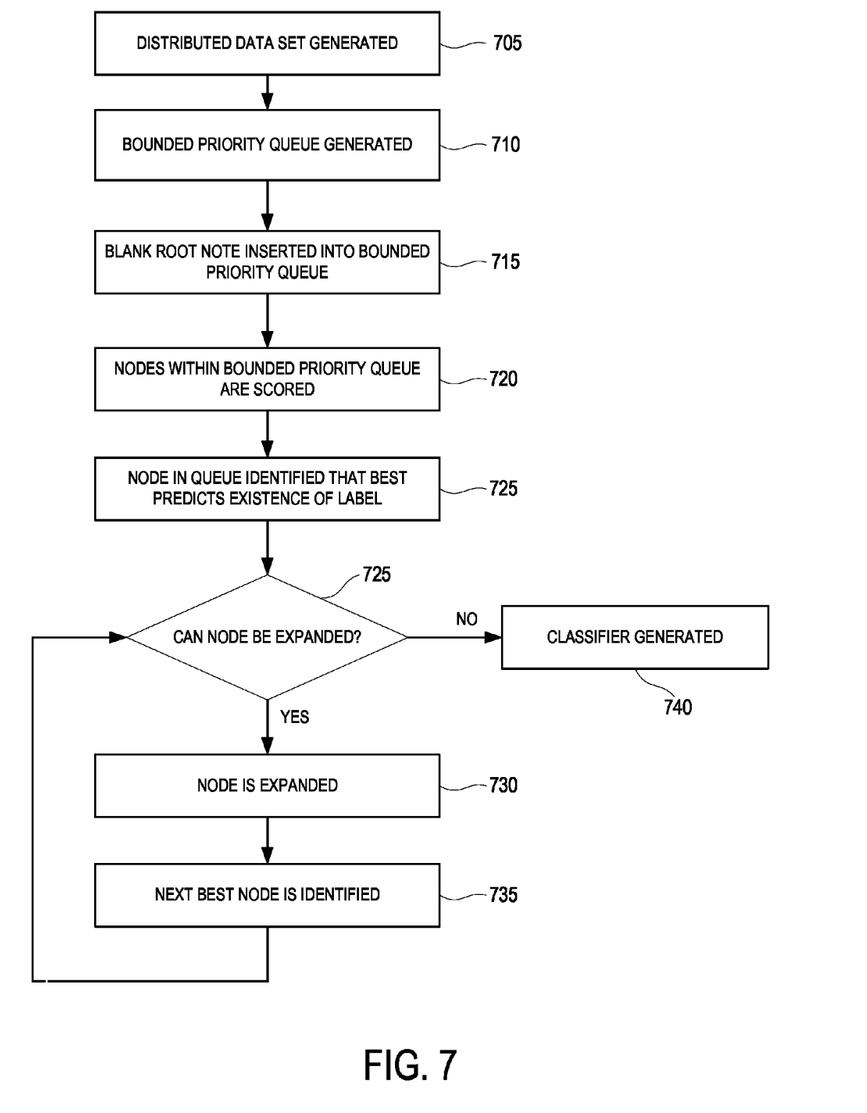
FIG. 7 is a block diagram flow chart showing an example method of generating one or more classifiers used to map labels to content, according to an implementation.

FIG. 7 is a block diagram flow chart showing an example method of generating one or more classifiers and using those classifiers to map labels to content, according to an implementation. Although the method is described with respect to example content comprised of images, the method is equally applicable to other content, including web pages, text, video, audio, and the like.

A distributed data set is generated that indicates the probability of observing sets of clusters, e.g., representing portions of images, in a corpus of images (705). Each set of clusters is a conjunction of clusters. For instance, a distributed data set may identify that a large number of images, relative to other images, have a combination of conjunctions comprised of cluster numbers 1, 5, and 8. In another example where content includes web pages rather than images, a distributed data set may provide that web pages (i.e., the corpus of documents) having the words 'car' and 'price' (i.e., labels) have a high probability of being identified, e.g., in query search results. According to an implementation, each conjunction identified in the distributed data set may represent a node in a tree.

The distributed data set is used to identify high-occurrence content and label associations in order to generate a classifier for identifying labels for previously unlabeled content. According to an implementation, the distributed data set can rank higher-occurring conjunctions according to the probability that each exists in a corpus of documents. According to an implementation, the conjunctions may be identified by popularity in an index of content, e.g., stored in the content database 385. The generation of the distributed data set can be implemented by the content identification module 380 and/or the classification module 335.

As previously described, extracted portions of images from a training set of images are compared to each other and those portions having matching or similar patterns are clustered. Each cluster is associated with at least one label, where the finite number of associations between the clusters and labels is referred to as a finite vocabulary. A classifier, which can be a high order conjunction, is generated for one or more (e.g., all) of the conjunctions within the distributed data set. According to an implementation, one or more classifiers are generated, where each is a high order conjunction used to predict one or more labels for content such as an image.

According to an implementation, using the distributed data set a bounded priority queue from the top 'k' clusters is generated (710). According to an implementation, a blank root node may be inserted into the bounded priority queue (715). The root node can be used to represent a conjunction of clusters that may be associated with one or more labels. According to an implementation, all of the nodes within the bounded priority queue are scored (720). The score may be based on the conditional probabilities of a node, which may be the probability that the conjunction identified by a node is associated with a label. A strong association (i.e., correlation) may exist, for example, where a cluster number occurs in every conjunction associated with the label 'car'. Well known methods of correlation may be used to determine correlation between clusters and labels.

Next, the node in the bounded priority queue that best predicts the existence of a label is identified (725). The label may be identified, for instance, as a commonly occurring label by the distributed data set. As an example, the node that best predicts the existence of the label 'car' may be identified, where the node identifies one or more cluster numbers that have the strongest correlation with the label 'car'. According to an implementation, the previous node identified as the best cluster for predicting the existence of a label is expanded, if possible, to identify children of the node (730). According to an implementation, a probabilistic sampling scheme may be used to identify a node for expansion where the sampling scheme samples the nodes from a distribution based on their conditional probabilities.

The next best cluster that correlates to the label is identified (735). According to an illustrative example, where the best node represents the conjunction of clusters 1, 3, and 5, the children of the best node may represent the same conjunction of clusters 1, 3, and 5, plus and additional cluster. Thus, the children represent a higher order conjunction. The children are ranked according to their conditional probabilities. Where one of the children nodes represents a stronger correlation with the label than the previous node, it is used to generate the classifier. This process iteratively repeats until the child nodes are not better than the previously identified node, or if there are no more nodes.

A classifier is generated using the sum of the conjunctions of best nodes available, which may then be used to predict labels for content (740). For instance, given a set of clusters generated for a new image, one or more classifiers can be applied against those clusters to determine if there is a strong correlation, as described above. If so, the clusters may be associated with a label associated with the classifier.

The systems, apparatus, and methods described in this specification may be implemented in computer processing systems including program code including program instructions that are executable by the computer processing system, which may be made up of one or more computers at one or more locations. Other implementations may also be used.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

That which is claimed:

1. A method implemented by data processing apparatus, the method comprising:
   generating a plurality of distinct clusters from training content wherein each of the plurality of clusters represents similar features of content items in the training content;
   identifying one or more conjunctions of the clusters based on a respective probability of observing features of each cluster of the conjunction in a collection of content items;

scoring each of a plurality of the identified conjunctions based at least partly on a conditional probability that the conjunction is associated with a label;

selecting a conjunction of the scored conjunctions that has a highest score as a current conjunction;

until a stopping condition is reached:

generating one or more higher-order child conjunctions for the current conjunction wherein each of the child conjunctions is a conjunction of the conjoined clusters of the current conjunction with one or more respective additional clusters that are not included in the conjoined clusters;

scoring each of the child conjunctions based at least partly on a conditional probability that the child conjunction is associated with the label;

if a highest scoring child conjunction has a score that is less than the score of the current conjunction, the stopping condition is reached, otherwise designating the highest scoring child conjunction as the current conjunction; and generating a classifier for the label from the current conjunction.

2. The method of claim 1 wherein identifying the conjunctions of clusters further comprises generating a distributed data set that indicates probabilities of observing the features in the collection of content items.

3. The method of claim 1 wherein the content items are images.

4. The method of claim 1 wherein the content items are text.

5. The method of claim 1 wherein a conjunction is a set of two or more clusters.

6. The method of claim 1 wherein a cluster represents a collection of content item portions that have similar features.

7. The method of claim 1 wherein the content items are images and wherein the images are examined at different scales and positions, and similar portions of the images are placed into respective clusters.

8. The method of claim 1 wherein content items are parsed into regions and those regions that have similar patterns are grouped into respective clusters.

9. A system comprising:

a machine-readable storage device with having instructions stored thereon;

data processing apparatus configured to execute the instructions to perform operations comprising:

generating a plurality of distinct clusters from training content wherein each of the plurality of clusters represents similar features of content items in the training content;

identifying one or more conjunctions of the clusters based on a respective probability of observing features of each cluster of the conjunction in a collection of content items;

scoring each of a plurality of the identified conjunctions based at least partly on a conditional probability that the conjunctions is associated with a label;

selecting a conjunction of the scored conjunctions that has a highest score as a current conjunction;

until a stopping condition is reached:

generating one or more higher-order child conjunctions for the current conjunction wherein each of the child conjunctions is a conjunction of the conjoined clusters of the current conjunction with one or more respective additional clusters that are not included in the conjoined clusters;

scoring each of the child conjunctions based at least partly on a conditional probability that the child conjunction is associated with the label;

if a highest scoring child conjunction has a score that is less than the score of the current conjunction, the stopping condition is reached, otherwise designating the highest scoring child conjunction as the current conjunction; and generating a classifier for the label from the current conjunction.

10. The system of claim 9 wherein the operations wherein identifying the conjunctions of clusters further comprises generating a distributed data set that indicates probabilities of observing the features in the collection of content items.

11. The system of claim 9 wherein the content items are images.

12. The system of claim 9 wherein the content items are text.

13. The system of claim 9 wherein a conjunction is a set of two or more clusters.

14. The system of claim 9 wherein a cluster represents a collection of content item portions that have similar features.

15. The system of claim 9 wherein the content items are images and wherein the images are examined at different scales and positions, and similar portions of the images are placed into respective clusters.

16. The system of claim 9 wherein content items are parsed into regions and those regions that have similar patterns are grouped into respective clusters.

17. A machine-readable storage device having instructions stored thereon, the instructions operable to cause data processing apparatus to perform operations comprising:

generating a plurality of distinct clusters from training content wherein each of the plurality of clusters represents similar features of content items in the training content;

identifying one or more conjunctions of the clusters based on a respective probability of observing features of each cluster of the conjunction in a collection of content items;

scoring each of a plurality of the identified conjunctions based at least partly on a conditional probability that the conjunction is associated with a label;

selecting a conjunction of the scored conjunctions that has a highest score as a current conjunction;

until a stopping condition is reached:

generating one or more higher-order child conjunctions for the current conjunction wherein each of the child conjunctions is a conjunction of the conjoined clusters of the current conjunction with one or more respective additional clusters that are not included in the conjoined clusters;

scoring each of the child conjunctions based at least partly on a conditional probability that the child conjunction is associated with the label;

if a highest scoring child conjunction has a score that is less than the score of the current conjunction, the stopping condition is reached, otherwise designating the highest scoring child conjunction as the current conjunction;

and generating a classifier for the label from the current conjunction.

18. The storage device of claim 17 wherein identifying the conjunctions of clusters further comprises generating a distributed data set that indicates probabilities of observing the features in the collection of content items.

19. The storage device of claim 17 wherein the content items are images.

20. The storage device of claim 17 wherein the content items are text.

21. The storage device of claim 17 wherein a conjunction is a set of two or more clusters.

22. The storage device of claim 17 wherein a cluster represents a collection of content item portions that have similar features.

23. The storage device of claim 17 wherein the content items are images and wherein the images are examined at different scales and positions, and similar portions of the images are placed into respective clusters.

24. The storage device of claim 17 wherein content items are parsed into regions and those regions that have similar patterns are grouped into respective clusters.

\* \* \* \* \*